July 1, 1941.   H. SCHUCHMANN ET AL   2,247,524
ELECTRONIC MICROSCOPE
Filed Dec. 27, 1939
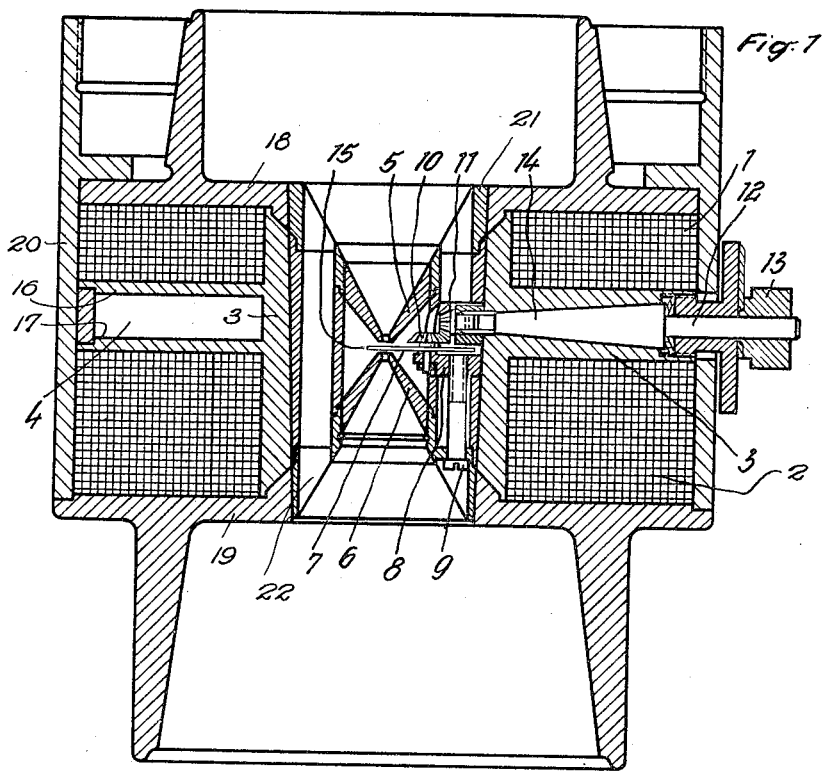
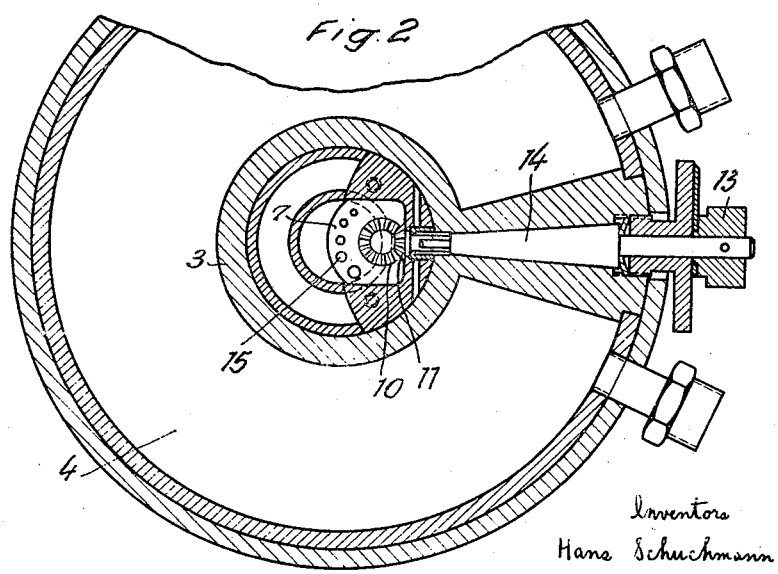
Inventors
Hans Schuchmann and
Ulrich Neubert
by Knight Bros
Attorneys Patented July 1, 1941

2,247,524

UNITED STATES PATENT OFFICE 2,247,524

ELECTRONIC MICROSCOPE

Hans Schuchmann, Berlin-Spandau, and Ulrich Neubert, Brunswick, Germany, assignors to "Fides Gesellschaft für die Verwaltung und Verwertung von gewerblichen Schutzrechten mit beschrankter Haftung," Berlin, Germany, a corporation of Germany Application December 27, 1939, Serial No. 311,132
In Germany November 5, 1938

8 Claims. (Cl. 250—161)

This invention relates to electron microscopes in which a beam of electrons is directed towards an object to be magnified and subjected to the effect of an electronic lens system which projects a magnified image of the object onto a screen or photosensitive layer. The lens system comprises one or more magnifying electronic lenses, usually an objective lens and a projection lens, formed for instance by electromagnet coils. In electronic microscopes of the above character the magnifying lenses hitherto employed have a constant effective aperture.

According to the invention, a magnifying electronic lens, for instance, the objective lens and/or projection lens of an electron microscope is provided with diaphragm means having different apertures which are replaced for one another and rendered effective with the aid of adjusting means serviceable exteriorly of the microscope. Such adjustable diaphragms are of advantage in many respects. For instance, it is preferable to use for the objective coil a small diaphragm aperture in order to enhance the contrasts and to produce low key images. However, if only a very small aperture is available, it is very difficult to properly adjust the electron producing means in such a manner that the electron beam passes through the diaphragm. An object of the invention is to provide an improved arrangement, whereby the above-mentioned drawback is avoided. This may be accomplished according to the invention by successively adjusting the diaphragm aperture to become smaller and smaller while adjusting the direction of the electron beam until the desired aperture is attained. However, there are cases where an objective lens with a relatively large diaphragm aperture is desired. These considerations show that the use of adjustable diaphragms according to the invention is of considerable importance in the case of the objective lens.

This applies also to the projection lens. Here, it is possible to bring about a different magnification by varying the intensity of the current, it being in this case particularly advantageous that the total magnification is thereby changed without affecting the adjustment of the objective lens. The magnification effected by the projection lens is determined by establishing a relation between the size of the final image and that of the diaphragm aperture of the projection lens. Consequently, when passing to projections of small magnifications, a diaphragm of larger aperture must be placed in the projection lens in order that the entire surface of the final image is properly illuminated. If projections of very great magnification are used, the reverse procedure is to be followed, i. e. a diaphragm of small aperture is required in order that its edge remains visible on the photographic plate. Since in practice the magnification of the same object is often rapidly changed, a replacement of the diaphragm in the projection lens must be possible during the operation of the microscope.

The invention may be carried into practice in various ways. Thus, for instance, each of the individual diaphragms allotted to the respective lenses may be provided with a separate adjusting device. The individual diaphragms may then be rendered effective by moving them into the path of the electron beam, for instance, with the aid of cord pulleys or Bowden pulley blocks. A particularly simple and practical form of the invention is obtained by using a single shutter capable of being adjusted exteriorly of the microscope and provided with the individual diaphragm perforations allotted to a lens. Such a shutter may be rotatably mounted or slidably arranged to move perpendicularly to the direction of the electron beam. In the latter case, the shutter may be arranged so that it may be reciprocated in a dovetailed guide. Such a shutter may be adjusted exteriorly of the microscope by means of a spindle drive, for instance. In this case, it is possible to attain in a simple manner a very accurate adjustment of the diaphragm aperture relatively to the beam. In order to adjust with certainty the desired position of the diaphragm aperture relatively to the beam, it is preferable to provide the shutter drive with stopping means so designed that the shutter is kept exactly in the position in which the diaphragm aperture has the desired effect. The attainment of the proper position may be rendered perceivable through the adjusting screw to be turned exteriorly of the microscope, thus ensuring an easy finding of the new position when adjusting the diaphragm.

In the accompanying drawing is shown an embodiment of the invention in diagrammatic form. Fig. 1 shows a longitudinal sectional view and Fig. 2 a transverse sectional view of a projection lens of an electronic microscope. Referring to the drawings, the energizing coil of the magnetic lens consists of two parts 1 and 2 separated from each other by a brass structure 3 forming two spaced partitions 16 and 17 and a cooling water channel 4 between the partitions. The ferromagnetic structure of the lens comprises three bodies 18, 19 and 20 enclosing the coil, and two funnel-shaped pole shoes 5 and 6 magnetically connected with bodies 18 and 19 respectively through intermediate pieces 21 and 22, respectively. Thus a magnetic circuit is established producing, when the coil is energized, a magnetic lens field in the gap between the pole pieces 5 and 6. Between the pole pieces 5 and 6 is arranged a diaphragm disk 7 having a number of perforations differing in diameter. As will be seen from Fig. 1 this disk is rotatably mounted on a body 8 secured to the pole piece structure with the aid of a screw 9. The diaphragm disk is driven by means of a gearing consisting of the two bevel gears 10 and 11. The bevel gear 11 is rotated by a driving shaft 12 provided with a knob 13. The intermediate portion 14 of the shaft 12 is designed in the form of a sealing cone and inserted in the brass structure 3.

The bevel gears 10 and 11 are preferably given different diameters so as to form a step-down transmission in order to render the adjustment of the diaphragm as accurate as possible. The two bevel gears 10 and 11 may be so arranged as to be displaceable in the axial direction in order to attain an exact centering of the diaphragm drive. Instead of a full disk 7 as shown in Fig. 1, a diaphragm in the form of a circular segment may be used, since the diameters of the diaphragm perforations are very small so that they may be arranged comparatively close to one another.

If the form of the invention shown in Figs. 1 and 2 is applied to an objective coil, it is preferable to design the diaphragm drive so that it is actuated from the side of the intermediate image.

In contradistinction to the form of the invention shown in Figs. 1 and 2, several diaphragms may be allotted to a projection lens and so located that they are selectively inserted in their operating position at different points along the path of the beam corresponding to the diameter of their aperture, the arrangement being such that the ratio of the distances of the image and the diaphragm from the main plane of the lens is approximately equal to the ratio of the size of the image and that of the aperture of the selected diaphragm.

What is claimed is:

1. In combination with an electron-optical device for producing magnified images of objects by subjecting an electron beam to electron-optical lens fields, a magnetic lens structure having two pole pieces spaced from each other in the axial direction of the beam and provided each with an opening on the electron-optical axis for the passage of the beam, diaphragm means of adjustable aperture, said means being arranged between said spaced pole pieces, and adjusting means adjustable exteriorly of the electron-optical device and operatively connected with said diaphragm means for varying said aperture independent of the position of the object.

2. An electron-optical lens structure comprising a ferromagnetic body, two central pole pieces spaced from each other in the direction of the electron-optical axis and having each an axial opening, said body and said pole pieces forming a magnetic circuit for producing a field between said pole pieces, a diaphragm disk disposed between said pole pieces and rotatable about an axis excentrical and parallel to the electron-optical axis, said disk having several apertures of different diameter to be placed selectively in the electron-optical axis in order to vary the effective aperture of the lens structure, and adjusting means connected with said diaphragm for rotating it from the outside of the lens structure.

3. An electron-optical lens for electron microscopes, comprising a ferromagnetic structure including two central pole pieces spaced from each other in the direction of the electron-optical axis and having each an axial opening, said structure forming a magnetic circuit for producing a field between said pole pieces, a diaphragm member arranged in proximity to said openings and secured to said structure so as to be movable transversely to the electron-optical axis, said diaphragm member having apertures of different diameter to be placed selectively in the electron-optical axis in order to vary the effective aperture of the lens structure, and adjusting means connected with said diaphragm member for controlling the position of said member from the outside of the structure.

4. An electron-optical lens for electron microscopes, comprising a ferromagnetic structure including two central pole pieces spaced from each other in the direction of the electron-optical axis and having each an axial opening, said structure forming a magnetic circuit for producing a field between said pole pieces, movable diaphragm means of selectively adjustable aperture secured to said structure in proximity to said openings for varying the effective aperture of the lens, an adjusting device for controlling the position of said diaphragm means, said device having gear means engaging said diaphragm means and arranged within said structure, actuating means disposed exteriorly of said structure, a connecting shaft and a tightening cone forming part of said shaft and engaging said structure for hermetically sealing it.

5. An electron-optical lens structure having a ferromagnetic portion forming two axially apertured poles spaced from each other in the direction of the electron-optical axis, a non-magnetic portion forming two axially spaced partitions, an energizing coil having two coil sections disposed so as to be separated by said spaced partitions, adjustable diaphragm means of selectively variable aperture disposed between said poles, and an adjusting device for controlling the position of said diaphragm means, said device having an exteriorly adjustable actuating member and mechanical means connecting said member with said diaphragm means and being arranged between said coil sections.

6. In an electron-optical lens structure as set forth in claim 5, the space between said partitions being sealed so as to form a closed cooling chamber, and conduit means connected with said chamber and arranged so as to form inlet and outlet passages for the cooling agent.

7. In an electron-optical device for producing magnified images of objects by subjecting an electron beam to a magnifying lens system, in combination, a projection lens forming part of said system, a plurality of movable diaphragms of different aperture associated with said lens, means for selectively placing said diaphragms into the path of the electron beam, said diaphragms being spaced from one another in the direction of the beam so that the ratio of the distances of the image and each diaphragm from the main plane of the lens is approximately equal to the ratio of the sizes of the image and said diaphragm.

8. In combination with an electron-optical device for producing magnified images of objects by subjecting an electron beam to the field of electron-optical lenses, a magnetical axial-symmetrical lens structure having an inner surface tapering towards the optical axis so as to form a narrow lens opening on the optical axis for the passage of the electron beam, diaphragm means having a variable aperture adjustable independently of the object, said diaphragm means being associated with said lens structure and arranged near said lens opening, and control means adjustable exteriorly of the device and connected with said diaphragm means for adjusting the diameter of said aperture.

HANS SCHUCHMANN.
ULRICH NEUBERT.